US012688710B2

(12) United States Patent
Hayakawa et al.

(10) Patent No.: US 12,688,710 B2
(45) Date of Patent: Jul. 21, 2026

(54) REARWARD WHITE LINE INFERENCE DEVICE, TARGET RECOGNITION DEVICE, AND METHOD

(71) Applicant: Hitachi Astemo, Ltd., Hitachinaka (JP)

(72) Inventors: Hitoshi Hayakawa, Hitachinaka (JP); Kento Kagimoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 317 days.

(21) Appl. No.: 18/566,585

(22) PCT Filed: Feb. 4, 2022

(86) PCT No.: PCT/JP2022/004439
§ 371 (c)(1),
(2) Date: Dec. 1, 2023

(87) PCT Pub. No.: WO2022/254788
PCT Pub. Date: Dec. 8, 2022

(65) Prior Publication Data
US 2024/0282123 A1 Aug. 22, 2024

(30) Foreign Application Priority Data
Jun. 4, 2021 (JP) ................................. 2021-094127

(51) Int. Cl.
*B60W 40/04* (2006.01)
*B60W 30/16* (2020.01)
(Continued)

(52) U.S. Cl.
CPC ........... *G06V 20/588* (2022.01); *B60W 30/16* (2013.01); *B60W 30/18163* (2013.01);
(Continued)

(58) Field of Classification Search
CPC .. G06V 20/588; G06V 20/58; G06V 2201/07; B60W 30/16; B60W 30/18163;
(Continued)

(56) References Cited

U.S. PATENT DOCUMENTS

2017/0053533 A1 2/2017 Kuroda
2019/0072970 A1* 3/2019 Izumori .......... B60W 30/18145

FOREIGN PATENT DOCUMENTS

JP 2019-046150 A 3/2019
JP 2019-194037 A 11/2019
WO WO-2015/194371 A1 12/2015

OTHER PUBLICATIONS

Ghallabi, Farouk, et al. "Lidar-based lane marking detection for vehicle positioning in an hd map." 2018 21st International Conference on Intelligent Transportation Systems (ITSC). IEEE, 2018. (Year: 2018).*

(Continued)

*Primary Examiner* — Andrew M Moyer
*Assistant Examiner* — Dylan John Mendez Muniz
(74) *Attorney, Agent, or Firm* — Foley & Lardner LLP

(57) ABSTRACT

An object is to provide a rearward white line inference device, a target recognition device, and a method capable of inferring a rearward white line with high accuracy. A rearward white line inference device includes: a white line detection unit that detects a white line ahead of a host vehicle; an azimuth-relative-to-white-line generation unit that obtains an azimuth of the host vehicle relative to the white line every predetermined time interval based on a detection result of the white line detection unit; and a relative azimuth inference unit that infers a relative azimuth from the azimuth of the host vehicle at a certain point based on the azimuth of the host vehicle obtained by the azimuth-relative-to-white-line generation unit.

11 Claims, 4 Drawing Sheets

(51) Int. Cl.

| | |
|---|---|
| *B60W 30/18* | (2012.01) |
| *G06T 7/70* | (2017.01) |
| *G06V 20/56* | (2022.01) |
| *G06V 20/58* | (2022.01) |
| *G08G 1/16* | (2006.01) |

(52) U.S. Cl.
CPC ................ *G06T 7/70* (2017.01); *G06V 20/58*
(2022.01); *B60W 2420/403* (2013.01); *B60W*
*2552/53* (2020.02); *B60W 2554/80* (2020.02);
*G06T 2207/30252* (2013.01); *G06V 2201/07*
(2022.01)

(58) Field of Classification Search
CPC ....... B60W 2420/403; B60W 2552/53; B60W
2554/80; B60W 50/0097; B60W 2520/14;
B60W 2554/805; B60W 40/04; G06T
7/70; G06T 2207/30252; G08G 1/16
See application file for complete search history.

(56) References Cited

OTHER PUBLICATIONS

Abosekeen, Ashraf, Aboelmagd Noureldin, and Michael J. Korenberg.
"Improving the RISS/GNSS land-vehicles integrated navigation
system using magnetic azimuth updates." IEEE Transactions on
Intelligent Transportation Systems 21.3 (2019): 1250-1263. (Year:
2019).*
International Search Report with English Translation of International Patent Application No. PCT/JP2022/004439 dated Apr. 26,
2022 (5 pages).

\* cited by examiner

| AZIMUTH INFERRING METHOD | UNUSABLE SITUATION | CONDITION FOR HIGH ACCURACY |
|---|---|---|
| GNSS | TUNNEL, BUILDING, ETC. | HIGH SPEED AND GOOD POSITIONING |
| INTEGRATION OF YAW RATE | NONE | SMALL DISTANCE AND SMALL DISPLACEMENT |
| DETECTION OF WHITE LINE | WHEN NO WHITE LINE IS DETECTED | SMALL CHANGE IN WHITE LINE |

REARWARD WHITE LINE INFERENCE DEVICE, TARGET RECOGNITION DEVICE, AND METHOD

TECHNICAL FIELD

The present invention relates to a rearward white line inference device, a target recognition device, and a method for grasping and recognizing a position of a target behind a vehicle in relation to a rearward white line.

BACKGROUND ART

While a vehicle is operated, it is necessary to ensure safety behind the vehicle, and it is necessary to detect a target, e.g., a vehicle, using a radar device and check a position of the vehicle. However, for example, when the host vehicle is traveling on a road with a plurality of lanes, it may be difficult for the radar device to determine which lane the following vehicle is traveling in. For example, on a curved road turning to the left, the following vehicle traveling in a lane on the right side of the lane in which the host vehicle is traveling may be positioned directly behind the host vehicle. In this case, it is not possible to determine a lane in which the following vehicle is traveling only with the radar device.

In this regard, in order to enable lane determination, PTL 1 is known as a travel assist apparatus that enables a radar device to recognize a following vehicle and determine a lane in which the following vehicle is traveling. The travel assist apparatus described in PTL 1 "calculates a lane shape in a section from a current position of a host vehicle to a rear position that is away from the current position of the host vehicle by a predetermined distance, based on a lane information group and a traveling trajectory of the host vehicle, the lane information group including information on a plurality of lanes detected from a plurality of images captured by an imaging device successively during a predetermined data acquisition period from a current time to a certain time in past to indicate a relative position of the host vehicle relative to each of the lanes, and the traveling trajectory of the host vehicle being a trajectory during the data acquisition period calculated based on detection results of a vehicle speed sensor and a yaw rate sensor during the data acquisition period".

CITATION LIST

Patent Literature

PTL 1: JP 2019-046150 A

SUMMARY OF INVENTION

Technical Problem

In PTL 1, the detection results of the vehicle speed sensor and the yaw rate sensor are used to calculate a lane shape in a section from a current position of the host vehicle to a rear position that is away from the current position of the host vehicle by a predetermined distance. In addition, it is known that the same can be performed by using a GNSS.

Meanwhile, it is important to consider a rearward white line for inferring a lane of a following vehicle necessary for predicting a risk such as lane change assistance. In addition, an advanced drive assistance system (ADAS)-equipped vehicle is generally equipped with a sensor that detects a forward white line, but is not equipped with a sensor that detects a rearward white line. Therefore, it is necessary to infer a rearward white line using a map or a forward white line detected in the past.

However, there is a problem that an azimuth of the host vehicle necessary for inferring a rearward white line cannot be obtained with high accuracy. For example, the GNSS depending on the map is not usable in tunnels, buildings, and the like, and yaw rate integration has an accumulated error, which increases when changing a lane.

Therefore, an object of the present invention is to provide a rearward white line inference device, a target recognition device, and a method capable of inferring a rearward white line with high accuracy.

Solution to Problem

In view of the above, according to the present invention, "a rearward white line inference device includes: a white line detection unit that detects a white line ahead of a host vehicle; an azimuth-relative-to-white-line generation unit that obtains an azimuth of the host vehicle relative to the white line every predetermined time interval based on a detection result of the white line detection unit; and a relative azimuth inference unit that infers a relative azimuth from the azimuth of the host vehicle at a certain point based on the azimuth of the host vehicle obtained by the azimuth-relative-to-white-line generation unit".

According to the present invention, "a target recognition device includes: a white line detection unit that detects a white line ahead of a host vehicle; an azimuth-relative-to-white-line generation unit that obtains an azimuth of the host vehicle relative to the white line every predetermined time interval based on a detection result of the white line detection unit; a relative azimuth inference unit that infers a relative azimuth from the azimuth of the host vehicle at a certain point based on the azimuth of the host vehicle obtained by the azimuth-relative-to-white-line generation unit; a target detection unit that detects a target behind the host vehicle; a moving distance inference unit that infers a moving distance of the host vehicle; a host vehicle trajectory inference unit that infers a moving trajectory of the host vehicle relative to the white line based on the relative azimuth inferred by the relative azimuth inference unit at every predetermined time interval and the moving distance inferred by the moving distance inference unit at every predetermined time interval; a white line position inference unit that infers a position of a white line outside a current detection range of the white line detection unit based on a past detection result of the white line detection unit and the moving trajectory; and a target position identification unit that identifies a positional relationship between the white line outside the detection range and the target based on the position of the white line outside the detection range inferred by the white line position inference unit and a position of the target detected by the target detection unit".

According to the present invention, "a rearward white line inference method using a computer includes: detecting a white line ahead of a host vehicle; obtaining an azimuth of the host vehicle relative to the white line every predetermined time interval based on a white line detection result; and inferring a relative azimuth from the azimuth of the host vehicle at a certain point based on the azimuth of the host vehicle".

According to the present invention, "a rearward white line inference method using a computer includes: detecting a white line ahead of a host vehicle; obtaining an azimuth of the host vehicle relative to the white line every predetermined time interval based on a white line detection result; inferring a relative azimuth from the azimuth of the host vehicle at a certain point based on the azimuth of the host vehicle; detecting a target behind the host vehicle; inferring a moving distance of the host vehicle; inferring a moving trajectory of the host vehicle relative to the white line based on the relative azimuth inferred at every predetermined time interval and the moving distance inferred at every predetermined time interval; inferring a position of a white line outside a current white line detection range based on a past white line detection result and the moving trajectory; and identifying a positional relationship between the white line outside the detection range and the target based on the position of the white line outside the inferred detection range and a position of the detected target".

Advantageous Effects of Invention

According to the present invention, it is possible to improve accuracy in identifying a lane in which a following vehicle is present.

DESCRIPTION OF EMBODIMENTS

Hereinafter, embodiments of the present invention will be described with reference to the drawings. An overall configuration example of a target recognition device will be described in a first embodiment, and a specific example in which a rearward white line is inferred, which is a main element in the target recognition device, will be described in a second embodiment.

First Embodiment

Figure 1:
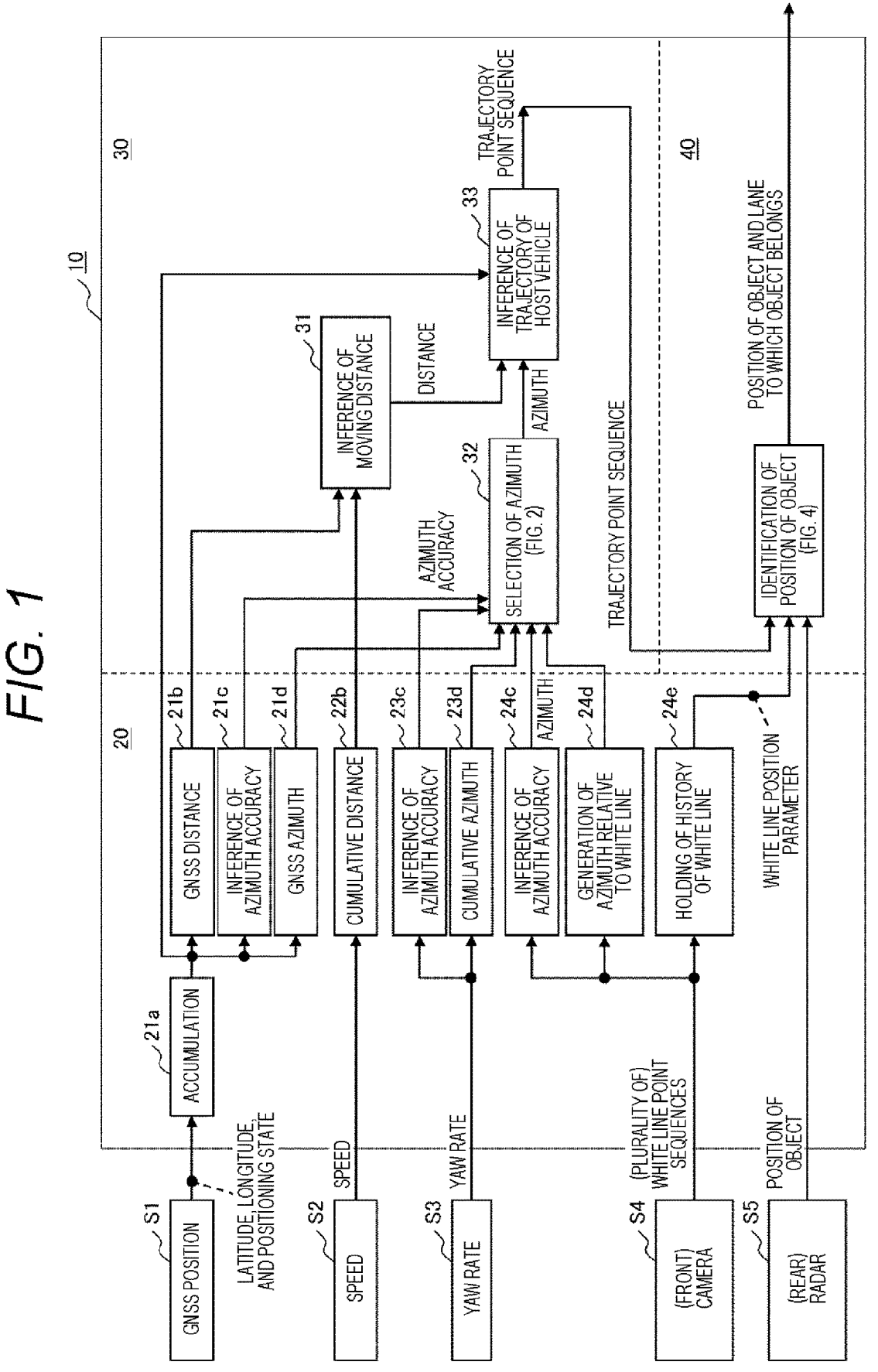
FIG. 1 is a diagram illustrating an overall configuration example of a target recognition device according to the present invention.

FIG. 1 is a diagram illustrating an overall configuration example of a target recognition device according to the present invention. The target recognition device 10 of FIG. 1 obtains outputs from a plurality of sensors S, and finally outputs a position of an object and a lane to which the object belongs. Concerning these sensors S and the outputs thereof, a GNSS (S1) outputs a latitude, a longitude, and a positioning state, a speed sensor S2 outputs a vehicle speed, a yaw rate sensor S3 outputs a yaw rate, a front camera S4 outputs a group of point sequences of forward white lines, and a rear radar outputs a position of an object (target). These sensor inputs are time-series information sampled at a predetermined cycle, and each piece of data includes time information about a sampled time. Note that the time information may be expressed with a timing of transmission by the sensor being treated as a time to save the amount of data. In addition, the amount of data may be saved by inputting data from a sensor only when a target object is detected by the sensor.

Note that the target recognition device 10, which has a partial function of a driver assistance device mounted on a vehicle capable of automatic driving, functions for the driver assistance device to output information on whether to change the lane change. In addition, the target recognition device 10 includes a control unit constituted by a computer in which a CPU, a ROM, a RAM, an input/output device, and the like are connected to a bus, and the control unit controls the target recognition device 10 based on a predetermined program.

In terms of main processing functions, the target recognition device 10 of FIG. 1 includes a distance/azimuth conversion unit 20 that converts an input signal into a distance or azimuth signal, a trajectory point sequence derivation unit 30 that obtains a moving trajectory of a vehicle as a trajectory point sequence from an output of the distance/azimuth conversion unit 20, and an object position identification unit 40 that obtains a position of an object behind the vehicle and a lane to which the object belongs.

The trajectory point sequence derivation unit 30, which obtains a moving trajectory of a vehicle as a trajectory point sequence, obtains distance information and azimuth information from an output of the distance/azimuth conversion unit 20. Among them, the distance information can be obtained from the latitude, longitude, and positioning state from the GNSS (S1) and the vehicle speed from the speed sensor S2, and the azimuth information can be obtained from the latitude, longitude, and positioning state from the GNSS (S1), the yaw rate from the yaw rate sensor S3, and the group of point sequences of forward white lines from the front camera S4.

Therefore, the distance/azimuth conversion unit 20 accumulates the latitude, longitude, and positioning state from the GNSS (S1) in an accumulation unit 21a, and extracts GNSS distance information 21b, GNSS azimuth accuracy inference information 21c, and GNSS azimuth information 21d included in the GNSS information. Among them, the GNSS distance information 21b is given to a moving distance inference unit 31 of the trajectory point sequence derivation unit 30, and the GNSS azimuth accuracy inference information 21c and the GNSS azimuth information 21d are given to an azimuth selection unit 32 of the trajectory point sequence derivation unit 30.

In addition, the distance/azimuth conversion unit 20, cumulative distance information 22b obtained by integrating the vehicle speed from the speed sensor S2 is given to the moving distance inference unit 31 of the trajectory point sequence derivation unit 30.

In addition, the distance/azimuth conversion unit 20 obtains cumulative azimuth information 23d by integrating the yaw rate from the yaw rate sensor S3, and obtains azimuth accuracy inference information 23c by inferring an azimuth accuracy. Note that, in this case, the azimuth accuracy is high when the distance is short and the displacement is small, but the azimuth accuracy decreases when the distance is long and the displacement is large, so that the accuracy can be obtained as a numerical value. The cumulative azimuth information 23d and the azimuth accuracy inference information 23c are given to the azimuth selection unit 32 of the trajectory point sequence derivation unit 30.

Furthermore, in the present invention, the distance/azimuth conversion unit 20 newly obtains azimuth-relative-to-white-line generation information 24d from the group of point sequences of forward white lines from the front camera S4, obtains azimuth accuracy inference information 24c by inferring an azimuth accuracy at this time, and holds a white line history in a white line history holding unit 24e. The azimuth-relative-to-white-line generation information 24d and the azimuth accuracy inference information 23c are given to the azimuth selection unit 32 of the trajectory point sequence derivation unit 30. In this case, the azimuth accuracy is high when the change in white line is small, but the azimuth accuracy decreases the change in white line is large, so that the accuracy can be obtained as a numerical value. Note that a method of calculating the azimuth-relative-to-white-line generation information 24d will be described in detail in the second embodiment.

In this way, in the present invention, a group of point sequences of forward white lines is newly used in addition to a GNSS and a yaw known as conventional requirements for inferring the rearward side. Based thereon, in the trajectory point sequence derivation unit 30, the moving distance inference unit 31 infers a moving distance from the GNSS distance information n 21b included in the GNSS information and the cumulative distance information 22b obtained by integrating the vehicle speed.

As a way of inferring a moving distance, if the GNSS is in a good condition, a difference in GNSS position is used, and when the use of the GNSS is inappropriate as the positioning state deteriorates due to terrain, obstacles such as tunnels and buildings, radio wave conditions, or the like, the cumulative distance information 22b obtained by time-integrating the vehicle speed may be inferred and output as a distance.

In addition, the trajectory point sequence derivation unit 30 may output an azimuth selected by the azimuth selection unit 32 based on one of the GNSS, the yaw, and the group of point sequences of forward white lines. In this case, the selection is made based on information (21c, 23c, 24c) on an azimuth accuracy obtained in association with each of the GNSS, the yaw, and the group of point sequences of forward white lines.

Figures 2, 3:
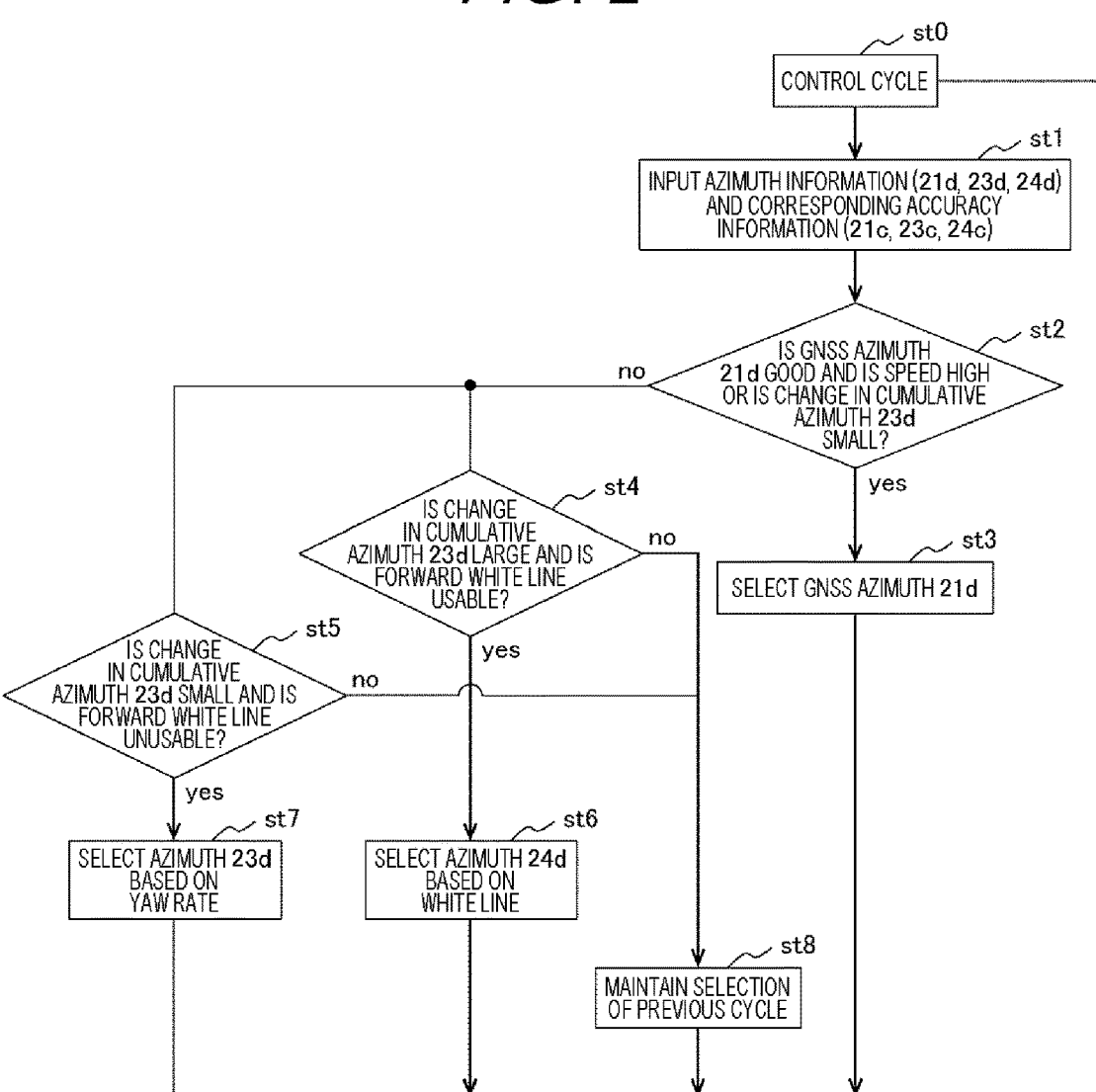
FIG. 2 is a flowchart illustrating processing performed by a trajectory point sequence derivation unit 30.
FIG. 3 is a diagram illustrating characteristics in each azimuth detection method.

FIG. 2 illustrates a flow of processing performed by the trajectory point sequence derivation unit 30. This flow is repeatedly executed at every predetermined control cycle as indicated by processing step St0. When a time determined by the control cycle is reached, in processing step St1 of FIG. 2, azimuth information (21d, 23d, 24d) on the GNSS, the yaw, and the group of point sequences of forward white lines and the corresponding azimuth accuracy information (21c, 23c, 24c) are input as inputs necessary for the processing here.

In processing step St2, it is determined whether a condition that the GNSS is good and the speed is high or the GNSS is good and the change in cumulative azimuth 23d is small is satisfied. When any of these conditions is satisfied (yes), the GNSS azimuth 21d is selected as azimuth information in the processing step St3.

In a case where the condition is not satisfied in the determination of the processing step St2 (no), determination is performed in processing step St4 or processing step St5. For example, when the change in cumulative azimuth 23d is large and the azimuth information 24d based on the group of point sequences of forward white lines is usable in the processing step St4, the azimuth 24d relative to the white line is selected as azimuth information in processing step St6.

Similarly, when the change in cumulative azimuth 23d is small and the azimuth information 24d based on the group of point sequences of forward white lines is unusable in the processing step St5, the azimuth 23d based on the yaw rate is selected as azimuth information in processing step St7.

Note that, in a case where none of the conditions for the determinations in the processing steps St2, St4, and St5 is satisfied (no), a result selected at a previous control cycle may be maintained as a sub-optimal measure for the time being in processing step st8. In addition, various conditions for making the above-described determinations may be directly detected, or may be detected using the azimuth accuracy information (21c, 23c, 24c).

The azimuth information selection result is passed to a host vehicle trajectory inference unit 33, which is a next-step processing unit, together with the distance information from the moving distance inference unit 31. After this selection, the processing returns to the processing step St0, and the target recognition device stands by until activation at a next control cycle is started.

The selection as illustrated in FIG. 2 reflects characteristics in each azimuth detection method as in FIG. 3. According to the comparison table of FIG. 3, azimuth detections based on the GNSS, the yaw, and the group of point sequences of forward white lines are exemplified as azimuth inferring methods on the vertical axis of the table, and unusable or non-preferable situations and conditions for high accuracy are listed on the horizontal axis of the table. According to this, the GNSS is unsuitable for use in tunnels and buildings, and the GNSS is used for detection with high accuracy under a high-speed traveling or good positioning condition. The yaw rate can be used at any time without a particular situation in which the yaw rate is not usable, but the yaw rate is used for detection with high accuracy under the condition that the distance is small or the displacement is small. Conversely, this means that the yaw rate is unsuitable for use when the distance or displacement is large, because the accuracy is low. The azimuth based on the group of point sequences of forward white lines is unusable in an environment where no white line exists, and can be highly accurate when the change in white line is small.

The host vehicle trajectory inference unit 33 in the trajectory point sequence derivation unit 30 performs processing at a control cycle (which may hereinafter be referred to as a frame), for example, at intervals of 50 ms using distance information and displacement information, and at this time, stores three types of azimuths detected based on the GNSS, the yaw, and the group of point sequences of forward white lines. In addition, although detection basically depends on the GNSS, when the GNSS is not usable, a current position/azimuth is accumulated from the azimuth and the moving distance. Here, the azimuth means that the current position/azimuth is accumulated using a difference from the azimuth <previous-cycle reference azimuth> stored in the same manner at the previous control cycle. The accumulated current position/azimuth is obtained as trajectory point sequence information.

Based on the above-described processing, trajectory point sequence information regarding the current position/azimuth from the host vehicle trajectory inference unit 33, white line history information 24e holding a point sequence of a forward white line captured by the front camera S4, and object position information grasped by the rear radar S5 are input to the object position identification unit 40.

Figure 4:
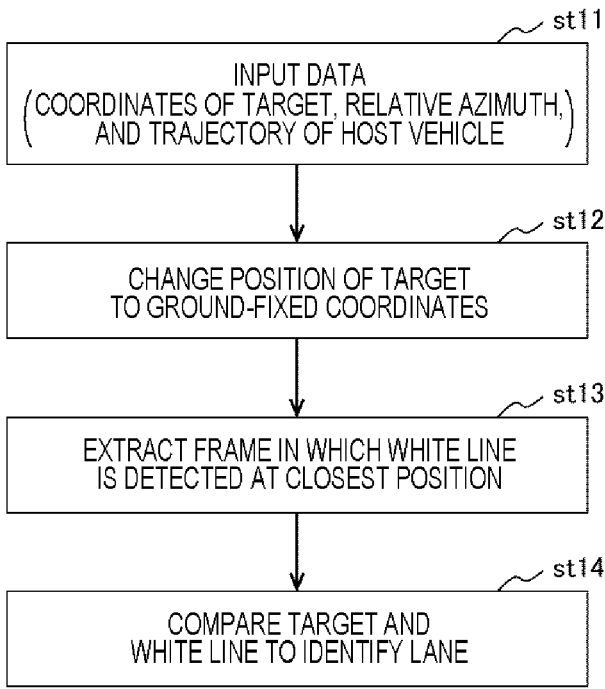
FIG. 4 is a flowchart illustrating processing performed by an object position identification unit 40.

Using these information, as illustrated in a processing flow of FIG. 4, the object position identification unit 40 inputs, as data necessary for processing in processing step St11, data on a position of a target (a radar target) grasped by the rear radar S5 in a host vehicle-centered coordinate system at a current time point, a difference (a relative azimuth) between a current azimuth of the host vehicle and an azimuth stored in the same manner at a previous cycle, and a current position of the host vehicle in a ground-fixed coordinate system (a trajectory of the host vehicle). Here, the host vehicle-centered coordinate system refers to a coordinate system based on the position and direction of the host vehicle, and for example, is an orthogonal coordinate system in which the center of the rear wheel axle is an origin, the direction forward of the host vehicle is a positive x-axis, the direction leftward of the host vehicle is a positive y-axis, and the direction upward of the host vehicle is a positive z-axis. The reference point in the host vehicle-centered coordinate system changes as the host vehicle moves or the direction of the host vehicle changes. Further, the ground-fixed coordinate system is a coordinate system based on a specific position outside the vehicle such as on a road, and for example, is a universal transverse mercator (UTM) orthogonal coordinate system obtained through conversion based on latitude and longitude. The ground-fixed system is a coordinate system that is basically constant regardless of whether host vehicle moves. However, as performed by using UTM, a plurality of ground-fixed coordinate systems may be used in a switchable manner as the host vehicle move, so as to reduce an error caused by the fact that the earth surface is not planar. In addition, any method is used to take a position and an azimuth as a reference of the ground-fixed coordinate system. For example, the ground-fixed coordinate system may be obtained by using a host vehicle-centered coordinate system at a certain specific time point without changing the reference according to the movement of the vehicle. The ground-fixed coordinate system in this example does not require a position of the vehicle on the Earth as in the UTM coordinate system, and thus can be used even in situations where GNSS is never available. In addition, as in the following embodiment, on the assumption that the road surface is flat, the z axis may be omitted to express coordinates in two dimensions, such that a calculation load is reduced.

Next, by using these data, the position of the radar target is projected on the ground-fixed coordinate system in processing step St12, a frame in the trajectory of the host vehicle in which a white line is detected at a position closest to the ground-fixed coordinates of the radar target is extracted in processing step St13, and the radar target and the white line are compared with each other in the host vehicle-centered coordinate system in the extracted frame to identify a lane in processing step St14.

According to the present invention described above, even when the GNSS is unsuitable for use, a lane can be identified while reducing an azimuth error, using a relative azimuth from a specific point of the azimuth relative to the white line, instead of an accumulated azimuth (integration of yaw rate) with a large error. In addition, it is possible to suppress an error caused by an azimuth error during conversion of the radar target from the host vehicle-centered coordinate system to the ground-fixed coordinate system, thereby improving the accuracy in comparison with the history white line.

Note that the processing in the present embodiment may be performed only when a position of an object and a lane to which the object belongs are necessary, such as when there is a following vehicle having a collision risk, thereby saving necessary computer resources. In addition, the present invention may be implemented in a case where a sensor capable of detecting a rearward white line, such as a rear camera, is mounted to compare a detection result of the sensor capable of detecting a rearward white line with a rearward white line inferred by the processing according to the present embodiment, thereby increasing accuracy or redundancy.

Second Embodiment

Figure 5:
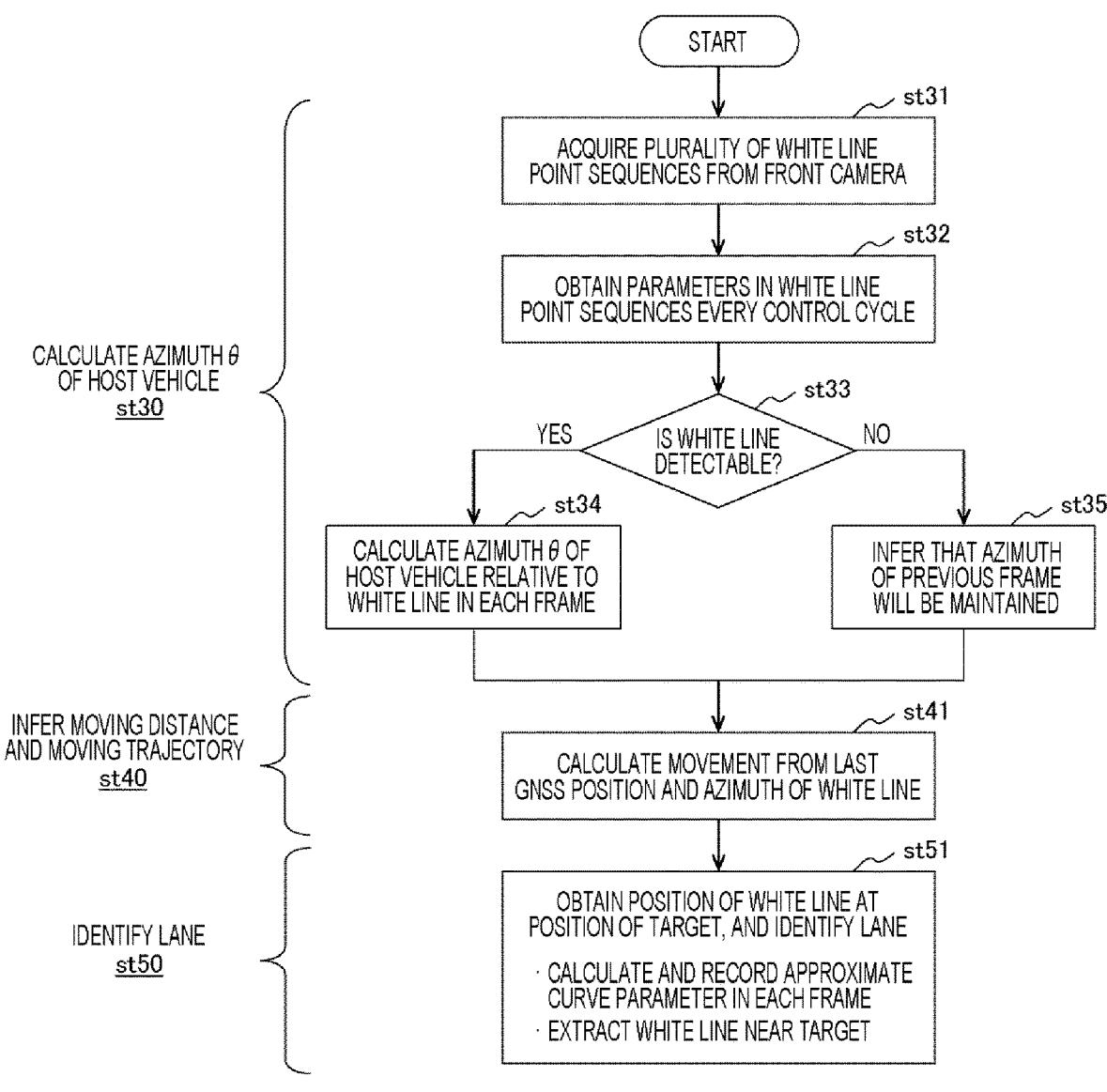
FIG. 5 is a flowchart illustrating processing for inferring a rearward white line according to a second embodiment.

In the second embodiment, a specific example in which a rearward white line is inferred, which is a main element in the target recognition device, will be described. FIG. 5 illustrates a specific example of a processing flow for inferring a rearward white line. The processing flow of FIG. 5 can be mainly represented by processing of a host vehicle azimuth θ calculation unit St30, a moving distance and moving trajectory inference unit St40, and a lane identification unit St50. Note that the host vehicle azimuth θ calculation unit St30 corresponds to the processing of the azimuth-relative-to-white-line generation 24d in FIG. 2, the moving distance and moving trajectory inference unit St40 corresponds to the processing of the moving distance inference 31 and the host vehicle trajectory inference 33 in FIG. 2, and the lane identification unit St50 corresponds to the processing of the object position identification unit 40 in FIG. 2.

In processing step St31 of the processing flow of FIG. 5, the host vehicle azimuth θ calculation unit St30 first acquires a plurality of time-series white line point sequences (an array of x and y arrangements) detected by the sensor S4 (front camera) in each frame (control cycle: 50 ms cycle).

Next, in processing step St32, a parameter is obtained in each white line point sequence. This is, for example, to express the plurality of white line point sequences obtained in time series as an approximation straight line ax+by+c=0 at each control cycle, and for example, linear approximation by a least squares method is performed. In this formula, a, b, and c are obtained as parameters, where b>0 and $a^2+b^2=1$, and an error ellipse major diameter obtained from a point distribution is obtained as a line segment length L.

In processing step St33, it is determined whether a white line is detectable. When a white line is detectable, the processing proceeds to processing step St34 to calculate an azimuth θ of the host vehicle relative to the white line in each frame. For example, the angle is calculated by a weighted average of coefficients of the approximation straight line, with a line segment length being a weight, between the plurality of point sequences. For example, θ=a tan 2 ($\Sigma(L*a)$, $\Sigma(L*b)$) is calculated. Note that a tan 2 is a standard function of C language, and is a function that receives a y-coordinate value and an x-coordinate value of a point in this order as arguments and returns an angle formed by a straight line connecting the origin and the point defined by the arguments with respect to the x axis in radian.

When it is determined in the processing step St33 that no white line has been detected, the processing proceeds to processing step St35, and it is inferred that an azimuth of a previous frame will be continued because no white line is visible. An integral value based on a yaw rate when a curve or a white line is not detected may be used.

Note that, although the linear approximation has been described as an example in the processing step St32, polynomial approximation may be performed as an approximate curve. In this case, a curve can also be expressed, and a relative angle of a forward position from a current value can be obtained from the derivative of the polynomial for use in integration. For example, when $y=ax^2+bx+c$, the relative angle a tan 2 (2ax, a) at the forward position x is obtained by the derivative y'=ax+b. In addition, also in a case where the approximation accuracy is enhanced by expression other than a polynomial such as arc similarity, the relative angle can be similarly obtained by differentiation.

In processing step St41 of the processing flow of FIG. 5, the moving distance and moving trajectory inference unit St40 calculates and integrates a movement (dx, dy) from the last GNSS position/azimuth relative to the white line to infer a moving trajectory together with a moving distance. As a calculation method, the moving distance is obtained as a product of a speed and a time elapsed from the previous frame, and the moving direction is obtained by adding a product of a yaw rate and the time elapsed from the previous frame to the azimuth θ of the host vehicle. This calculation method is simple but includes an error. However, the error can be reduced by reducing the time elapsed from the previous frame by division or the like.

In processing step St51 of the processing flow of FIG. 5, the lane identification unit St50 obtains a position of the white line at the position of the target to identify a lane. For example, specifically, an approximate curve parameter (second order approximation+value range) in each frame is calculated and recorded, and a white line near the target is set to a position where the white line can be detected with the highest quality. For example, if a position of 20 m ahead is most easily captured, the position is assumed to be 20 m behind. Using this, a frame at the self-position is obtained and compared with the position of the white line at that time to identify a lane.

According to the rearward white line inference method of the second embodiment, it is possible to provide a third method other than the rearward white line inference methods based on the GNSS and the yaw rate, and it is possible to infer a rearward white line by the best method in which these methods are combined based on the advantages and disadvantages of these methods.

REFERENCE SIGNS LIST 20 distance/azimuth conversion unit
30 trajectory point sequence derivation unit
31 moving distance inference unit
32 azimuth selection unit
33 host vehicle trajectory inference unit
40 object position identification unit
S1 GNSS
S2 speed sensor
S3 yaw rate sensor
S4 front camera

The invention claimed is:

1. A rearward white line inference device comprising a processor configured to: detect a white line ahead of a host vehicle; obtain a default azimuth of the host vehicle relative to the white line every predetermined time interval based on a white line detection result; select: (i) the default azimuth by default; (ii) an azimuth based on a Global Navigation Satellite System (GNSS), in response to satisfying a first condition that (a) a positioning state of the GNSS is within a predetermined accuracy, and (b) a speed is above a predetermined level or a change in cumulative azimuth is below a predetermined level: (iii) an azimuth based on a group of point sequences of forward white lines, in response to satisfying a second condition that (a) the first condition is not satisfied, (b) the change in cumulative azimuth is above the predetermined level, and (c) at least one white line exists; and (iv) an azimuth based on a yaw rate, in response to satisfying a third condition that (a) the first condition is not satisfied, (b) the change in cumulative azimuth is below the predetermined level, and (c) no white line exists; and determine a relative azimuth of the host vehicle at a certain point based on the selected azimuths of the host vehicle.

2. The rearward white line inference device according to claim 1, wherein the white line detection result is a function expressing white line point sequences during a predetermined cycle, and the default azimuth is obtained from positions of the white line point sequences between different time points.

3. A target recognition device comprising a processor configured to: detect a white line ahead of a host vehicle; obtain a white-line azimuth of the host vehicle relative to the white line every predetermined time interval based on a white line detection result; select: (i) the white-line azimuth; (ii) an azimuth based on a Global Navigation Satellite System (GNSS), in response to satisfying a first condition that (a) a positioning state of the GNSS is within a predetermined accuracy, and (b) a speed is above a predetermined level or a change in cumulative azimuth is below a predetermined level: (iii) an azimuth based on a group of point sequences of forward white lines, in response to satisfying a second condition that (a) the first condition is not satisfied, (b) the change in cumulative azimuth is above the predetermined level, and (c) at least one white line exists; and (iv) an azimuth based on a yaw rate, in response to satisfying a third condition that (a) the first condition is not satisfied, (b) the change in cumulative azimuth is below the predetermined level, and (c) no white line exists; determine a relative azimuth of the host vehicle at a certain point based on the selected azimuths of the host vehicle; detect a target behind the host vehicle; determine a moving distance of the host vehicle; determine a moving trajectory of the host vehicle relative to the white line based on the relative azimuth at every predetermined time interval and the moving distance at every predetermined time interval; determine a position of a white line outside a current detection range based on a past detection result and the moving trajectory; and identify a positional relationship between the white line outside the detection range and the target based on the position of the white line outside the detection range, and a position of the detected target.

4. The target recognition device according to claim 3, wherein the white line detection result is a function expressing white line point sequences that are periodically output, and the white-line azimuth is obtained from positions of the white line point sequences between different time points.

5. The target recognition device according to claim 3, wherein the processor is further configured to determine the moving trajectory of the host vehicle relative to the white line using a change in relative azimuth.

6. The target recognition device according to claim 3, wherein the processor is further configured to: select the azimuth based on the GNSS by default; and select either the white-line azimuth or the azimuth based on the yaw rate, when the positioning state of the GNSS is not within the predetermined accuracy.

7. The target recognition device according to claim 3, wherein a position and the white-line azimuth of the host vehicle are stored in association with each other.

8. The target recognition device according to claim 3, wherein the processor is further configured to record a detected past position of the white line, using an approximate parameter for the recording.

9. The target recognition device according to claim 3, wherein the processor is further configured to capture the white line closest to the target using a white line recorded as a position of the host vehicle on the moving trajectory at a time point.

10. A rearward white line inference method using a computer, the rearward white line inference method comprising: detecting a white line ahead of a host vehicle; obtaining a default azimuth an azimuth of the host vehicle relative to the white line every predetermined time interval based on a white line detection result; select: (i) the default azimuth by default; (ii) an azimuth based on a Global Navigation Satellite System (GNSS), in response to satisfying a first condition that (a) a positioning state of the GNSS is within a predetermined accuracy, and (b) a speed is above a predetermined level or a change in cumulative azimuth is below a predetermined level; (iii) an azimuth based on a group of point sequences of forward white lines, in response to satisfying a second condition that (a) the first condition is not satisfied, (b) the change in cumulative azimuth is above the predetermined level, and (c) at least one white line exists; and (iv) an azimuth based on a yaw rate, in response to satisfying a third condition that the first condition is not satisfied, (b) the change in cumulative azimuth is below the predetermined level, and (c) no white line exists; and determining a relative azimuth of the host vehicle at a certain point based on the selected azimuths of the host vehicle.

11. A target recognition method using a computer, the target recognition method comprising: detecting a white line ahead of a host vehicle; obtaining a white-line azimuth of the host vehicle relative to the white line every predetermined time interval based on a white line detection result; selecting: (i) the white-line azimuth; (ii) an azimuth based on a Global Navigation Satellite System (GNSS), in response to satisfying a first condition that (a) a positioning state of the GNSS is within a predetermined accuracy, and (b) a speed is above a predetermined level or a change in cumulative azimuth is below a predetermined level; (iii) an azimuth based on a group of point sequences of forward white lines, in response to satisfying a second condition that (a) the first condition is not satisfied, (b) the change in cumulative azimuth is above the predetermined level, and (c) at least one white line exists; and (iv) an azimuth based on a yaw rate, in response to satisfying a third condition that the first condition is not satisfied, (b) the change in cumulative azimuth is below the predetermined level, and (c) no white line exists; determining a relative azimuth of the host vehicle at a certain point based on the selected azimuths of the host vehicle; detecting a target behind the host vehicle; determining a moving distance of the host vehicle; determining a moving trajectory of the host vehicle relative to the white line based on the relative azimuth at every predetermined time interval and the moving distance at every predetermined time interval; determining a position of a white line outside a current white line detection range based on a past white line detection result and the moving trajectory; and identifying a positional relationship between the white line outside the detection range and the target based on the position of the white line outside the inferred detection range and a position of the detected target.

* * * * *